United States Patent
Chuang et al.

(10) Patent No.: US 11,258,310 B2
(45) Date of Patent: Feb. 22, 2022

(54) DUAL DECODER FOR WIRELESS CHARGING RECEIVER AND WIRELESS CHARGING RECEIVER USING THE SAME

(71) Applicant: Generalplus Technology Inc., Hsinchu (TW)

(72) Inventors: Down Xu Chuang, Zhunan Township, Miaoli County (TW); Chau Chin Chuang, Hsinchu (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 387 days.

(21) Appl. No.: 16/371,564

(22) Filed: Apr. 1, 2019

(65) Prior Publication Data
US 2019/0305611 A1  Oct. 3, 2019

(30) Foreign Application Priority Data
Mar. 30, 2018  (TW) .................................. 107111160

(51) Int. Cl.
| | |
|---|---|
| *H02J 50/80* | (2016.01) |
| *H02J 7/02* | (2016.01) |
| *H04B 1/16* | (2006.01) |
| *H04B 1/00* | (2006.01) |
| *H02J 50/12* | (2016.01) |
| *H04L 27/14* | (2006.01) |

(52) U.S. Cl.
CPC .............. *H02J 50/80* (2016.02); *H02J 7/025* (2013.01); *H02J 50/12* (2016.02); *H04B 1/0028* (2013.01); *H04B 1/16* (2013.01); *H04L 27/14* (2013.01)

(58) Field of Classification Search
CPC ........................................................ H02J 50/80
USPC .......................................................... 320/108
See application file for complete search history.

(56) References Cited

U.S. PATENT DOCUMENTS

| | | | |
|---|---|---|---|
| 2012/0032632 A1* | 2/2012 | Soar ........................ | H02J 50/70 320/108 |
| 2013/0235632 A1* | 9/2013 | Knoedgen ............... | H02J 50/40 363/126 |
| 2018/0309314 A1* | 10/2018 | White, II ................ | H02J 50/40 |

* cited by examiner

*Primary Examiner* — Joseph Chang
(74) *Attorney, Agent, or Firm* — Muncy, Geissler, Olds & Lowe, P.C.

(57) ABSTRACT

A dual decoder for a wireless charging receiver and a wireless charging receiver using the same are provided. The wireless charging receiver includes a resonant circuit, a rectifier circuit and a dual decoder for the wireless charging receiver. The rectifier circuit coupled to the resonant circuit converts wireless energy received by the resonant circuit into a direct current. The dual decoder includes a frequency decoding circuit and a voltage amplitude decoding circuit. The frequency decoding circuit performs decoding according to a frequency of a voltage of the resonant circuit to obtain an instruction of a wireless transmitter. The voltage amplitude decoding circuit extracts a carrier on the voltage of the resonant circuit through a filter, and decodes the carrier into the instruction of the wireless transmitter. With the complementary of two-way decoding, the communication system becomes robuster.

20 Claims, 8 Drawing Sheets

DUAL DECODER FOR WIRELESS CHARGING RECEIVER AND WIRELESS CHARGING RECEIVER USING THE SAME

CROSS-REFERENCE TO RELATED APPLICATIONS

This application claims priority of No. 107111160 filed in Taiwan R.O.C. on Mar. 30, 2018 under 35 USC 119, the entire content of which is hereby incorporated by reference.

BACKGROUND OF THE INVENTION

Field of the Invention

The invention relates to the wireless charging technology, and more particularly to a dual decoder for a wireless charging receiver and a wireless charging receiver using a dual decoder.

Description of the Related Art

In the QI wireless charging product, a power receiver (Rx) in the Wireless Power Consortium (WPC) specification needs to communicate with a wireless transmitter bidirectionally. The frequency shift keying (FSK) is used when the wireless transmitter sends the message to the wireless charging receiver; and the amplitude shift keying (ASK) is used when the wireless charging receiver sends the message to the wireless transmitter.

The wireless charging FSK code is the signal generated by the frequency shifting of the wireless transmitter, wherein the frequency fluctuating range can be adjusted by the software of the wireless transmitter and is also explained in the QI agreement, and the receiver can capture the modulation signal through a demodulation circuit. The receiving frequency is the frequency sensed by the coil in the wireless charging receiver close to the coil of the wireless transmitter. The decoding circuit thereof is also disclosed in the QI.

In the experimental process, however, the applicants have discovered that the decoding failure often occurs at the end of the receiver so that the wireless charging receiver cannot be correctly connected to the wireless transmitter.

BRIEF SUMMARY OF THE INVENTION

An objective of the invention is to provide a dual decoder for a wireless charging receiver and a wireless charging receiver using the same. By designing two decoders to perform decoding at the same time, the communication system becomes robuster because the two demodulators are complementary to each other.

In view of this, the invention provides a dual decoder for performing a decode in a wireless charging receiver, wherein the wireless charging receiver includes a resonant circuit and a rectifier circuit, wherein the rectifier circuit converts wireless energy received by the resonant circuit into a direct current. The dual decoder includes a frequency decoding circuit and a voltage amplitude decoding circuit. The frequency decoding circuit is coupled to the resonant circuit, and performs decoding according to a frequency of a voltage of the resonant circuit to obtain an instruction of a wireless transmitter. The voltage amplitude decoding circuit is coupled to the resonant circuit, extracts a carrier on the voltage of the resonant circuit through a filter, and decodes the carrier into the instruction of the wireless transmitter. When the voltage amplitude decoding circuit cannot perform decoding, the frequency decoding circuit performs decoding to obtain a message transmitted by the wireless transmitter. When the frequency decoding circuit cannot perform decoding, the voltage amplitude decoding circuit performs decoding to obtain the message transmitted by the wireless transmitter.

The invention further provides a wireless charging receiver. The wireless charging receiver includes a resonant circuit, a rectifier circuit and a dual decoder for the wireless charging receiver. The rectifier circuit coupled to the resonant circuit converts wireless energy received by the resonant circuit into a direct current. The dual decoder for the wireless charging receiver includes a frequency decoding circuit and a voltage amplitude decoding circuit. The frequency decoding circuit is coupled to the resonant circuit, and performs decoding according to a frequency of a voltage of the resonant circuit to obtain an instruction of a wireless transmitter. The voltage amplitude decoding circuit is coupled to the resonant circuit, extracts a carrier on the voltage of the resonant circuit through a filter, and decodes the carrier into the instruction of the wireless transmitter. When the voltage amplitude decoding circuit cannot perform decoding, the frequency decoding circuit performs decoding to obtain a message transmitted by the wireless transmitter. When the frequency decoding circuit cannot perform decoding, the voltage amplitude decoding circuit performs decoding to obtain the message transmitted by the wireless transmitter.

In the dual decoder and the wireless charging receiver according to the embodiment of the present invention, the resonant circuit includes an inductor and a capacitor. The first terminal of the inductor is coupled to a second input terminal of the rectifier circuit. The first terminal of the capacitor is coupled to the second terminal of the inductor, and the second terminal of the capacitor is coupled to a first input terminal of the rectifier circuit. In a preferred embodiment, the frequency decoding circuit includes a voltage limiting circuit, a band pass filter, a DC bias circuit and a microprocessor. The voltage limiting circuit is coupled to the second terminal of the capacitor, receives the voltage of the resonant circuit, limits an amplitude of the voltage of the resonant circuit, and outputs a limited voltage. The band pass filter receives the limited voltage, performs band pass filtering and outputs a band-pass filtered signal. The DC bias circuit performs voltage dividing on the band-pass filtered signal to obtain a DC bias signal. The microprocessor receives the DC bias signal, and performs decoding according to a frequency of the DC bias signal to obtain the message transmitted by the wireless transmitter.

In the dual decoder and the wireless charging receiver according to the embodiment of the present invention, the voltage amplitude decoding circuit includes a band pass filter, a Schmitt trigger and a microprocessor. The band pass filter is coupled to the first terminal of the capacitor, performs band pass filtering and outputs a band-pass filtered signal. The Schmitt trigger receives the band-pass filtered signal and outputs a comparison signal. The microprocessor receives the comparison signal, and obtains the message transmitted by the wireless transmitter according to the comparison signal.

The essence of the invention is to utilize two different mechanisms of decoding circuits to complement each other, wherein one of the mechanisms uses frequency sampling and the other one of the mechanisms uses AC voltage amplitude sampling. Thus, the problem of receiving missing packets by the wireless receiver is solved, so that the communication system of the wireless receiver becomes robuster.

The above-mentioned and other objects, features and advantages of the present invention will become more apparent from the following detailed descriptions of preferred embodiments thereof taken in conjunction with the accompanying drawings.

DETAILED DESCRIPTION OF THE INVENTION

The applicants have discovered through experiments that when the transmitting end uses the phase shift pulse width modulation, the frequency shift keying (FSK) carrier is concurrently loaded to cause much noise, so that the frequency decoding circuit of the receiving end cannot judge the frequency, and that the decoding cannot be performed to obtain the message transmitted by the wireless transmitter. Therefore, the wireless charging receiver and the wireless transmitter are disconnected from each other.

Figure 1:
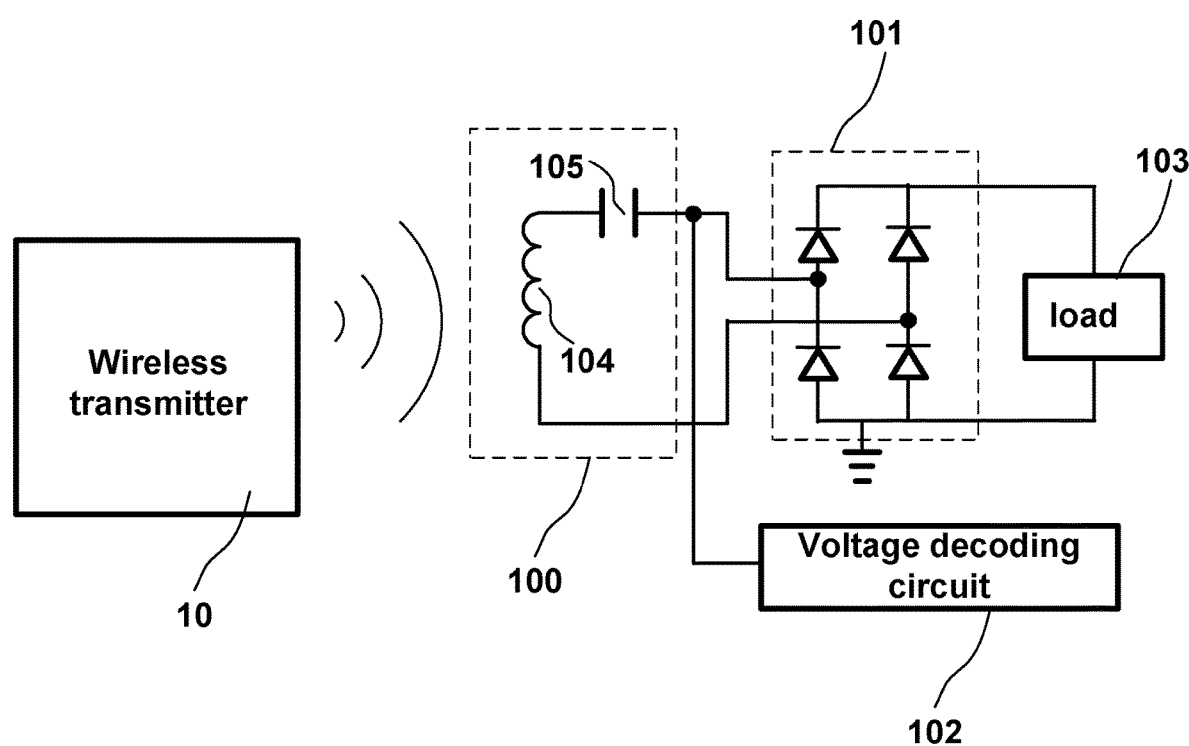
FIG. 1 is a circuit diagram showing a wireless charging receiver according to a preferred embodiment of the invention.

FIG. 1 is a circuit diagram showing a wireless charging receiver according to a preferred embodiment of the invention. Referring to FIG. 1, the wireless charging receiver includes a resonant circuit 100, a bridge rectifier circuit 101, a voltage decoding circuit 102 and a load 103. The resonant circuit 100 includes an inductor 104 and a capacitor 105. The resonant circuit 100 receives wireless energy, which is transmitted from a wireless transmitter 10 to the load 103 through the bridge rectifier circuit 101. When a wireless transmitter uses the phase shift pulse width modulation, a frequency decoding circuit cannot judge a frequency. Therefore, the voltage decoding circuit 102 is used in this embodiment. The decoding is performed by sampling a voltage on the resonant circuit 100. The circuit can indeed perform decoding to obtain an instruction of the wireless transmitter when the wireless transmitter uses the phase shift pulse width modulation.

When the wireless transmitter 10 transmits a signal to the wireless charging receiver, its work frequency ranges from 110 KHZ to 205 KHZ, for example. The wireless transmitter 10 only needs to control the frequency, so that the output power and the amplitude of the AC voltage given to the wireless charging receiver can be controlled. However, the applicants have discovered that when the modulation ranges from 180 KHZ to 205 KHZ (i.e., when the non-resonant frequency low-power operation is performed), the operation frequency deviates from the resonance point, and the variation of the amplitude of the alternating current received by the wireless charging receiver is reduced. Thus, the voltage decoding circuit 102 cannot perform decoding to obtain the instruction of the wireless transmitter.

Figure 2:
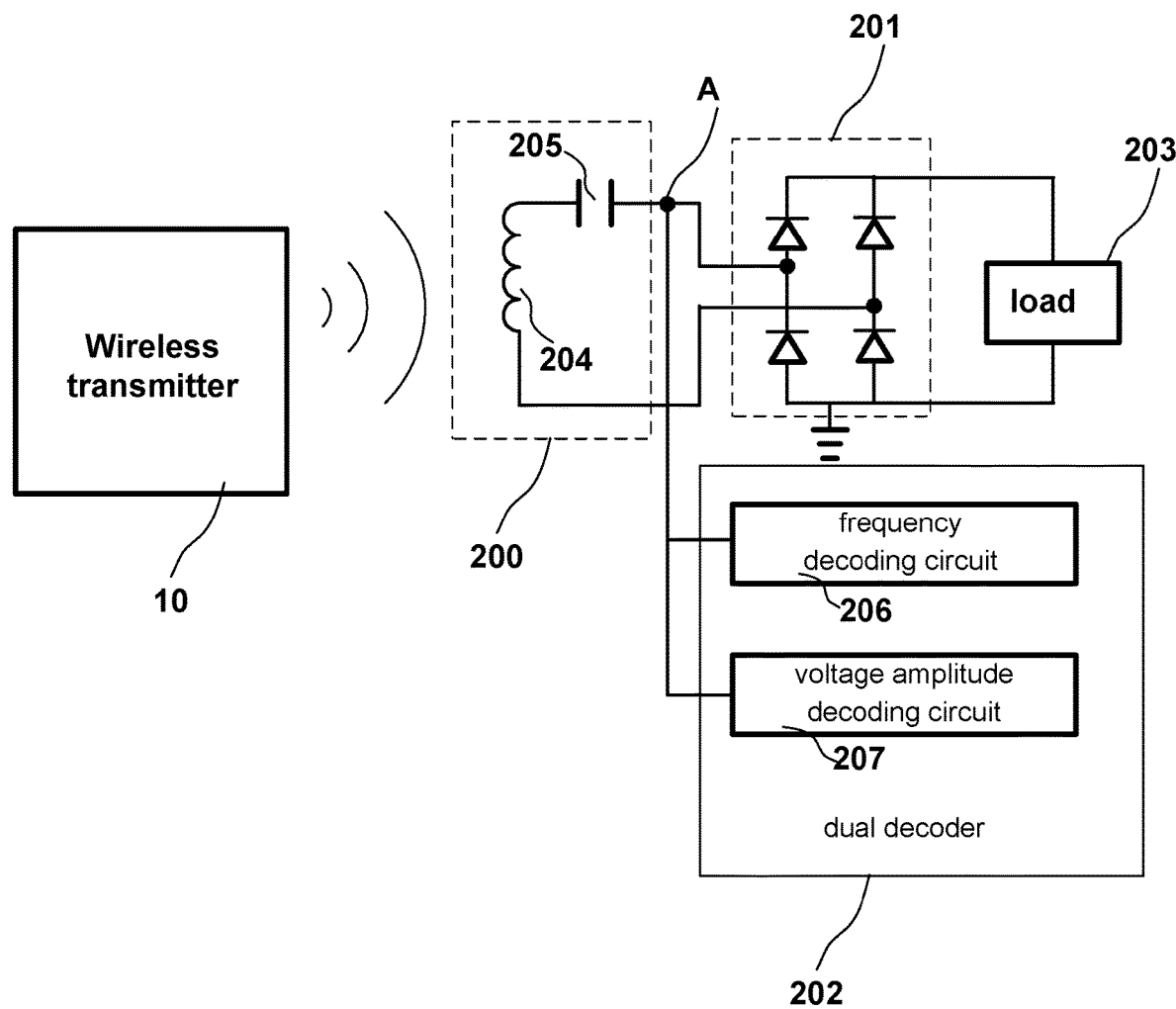
FIG. 2 is a circuit diagram showing a wireless charging receiver according to a preferred embodiment of the invention.

With the above-mentioned experiment, it is confirmed that two different patterns of wireless charge decoding circuits have their own conditions of decoding failures. So, the applicants adopt a circuit that combines the two patterns of wireless charge decoding circuits. FIG. 2 is a circuit diagram showing a wireless charging receiver according to a preferred embodiment of the invention. Referring to FIG. 2, the wireless charging receiver includes a resonant circuit 200, a bridge rectifier circuit 201, a dual decoder 202 for the wireless charging receiver and a load 203. The resonant circuit 200 includes an inductor 204 and a capacitor 205. The resonant circuit 200 receives wireless energy transmitted from a wireless transmitter 20 to the load 203 through the bridge rectifier circuit 201. The dual decoder for the wireless charging receiver 202 includes a frequency decoding circuit 206 and a voltage amplitude decoding circuit 207.

The frequency decoding circuit 206 is coupled to the capacitor 205 (node A) of the resonant circuit 200. Similarly, the voltage amplitude decoding circuit 207 is coupled to the capacitor 205 (node A) of the resonant circuit 200. The two decoding circuits 206 and 207 are coupled to the same node, but their operation mechanisms are different from each other. The frequency decoding circuit 206 samples a frequency of a signal at the node A, and the voltage amplitude decoding circuit 207 samples a voltage amplitude of the signal at the node A. So, upon accessing, the frequency decoding circuit 206 directly filters the received signal, ranging from 110 KHZ to 205 KHZ, into readable waveforms, which are usually square waves. On the contrary, the voltage amplitude decoding circuit 207 uses a low-pass filter to capture the amplitude of the signal, so that the signal obtained through the voltage amplitude decoding circuit 207 ranges from about 1 KHZ to about 2 KHZ. When the wireless transmitter performs a specific operation, such as the above-mentioned phase shift pulse width modulation, to cause the sampling failure of the frequency decoding circuit 206 and the decoding failure, the voltage amplitude decoding circuit 207 performs decoding to obtain a message transmitted by the wireless transmitter 10. Similarly, when the voltage amplitude decoding circuit 207 cannot perform decoding due to the lower received energy and a too-low gain, the frequency decoding circuit 206 performs decoding to obtain the message transmitted by the wireless transmitter 10.

Figure 3:
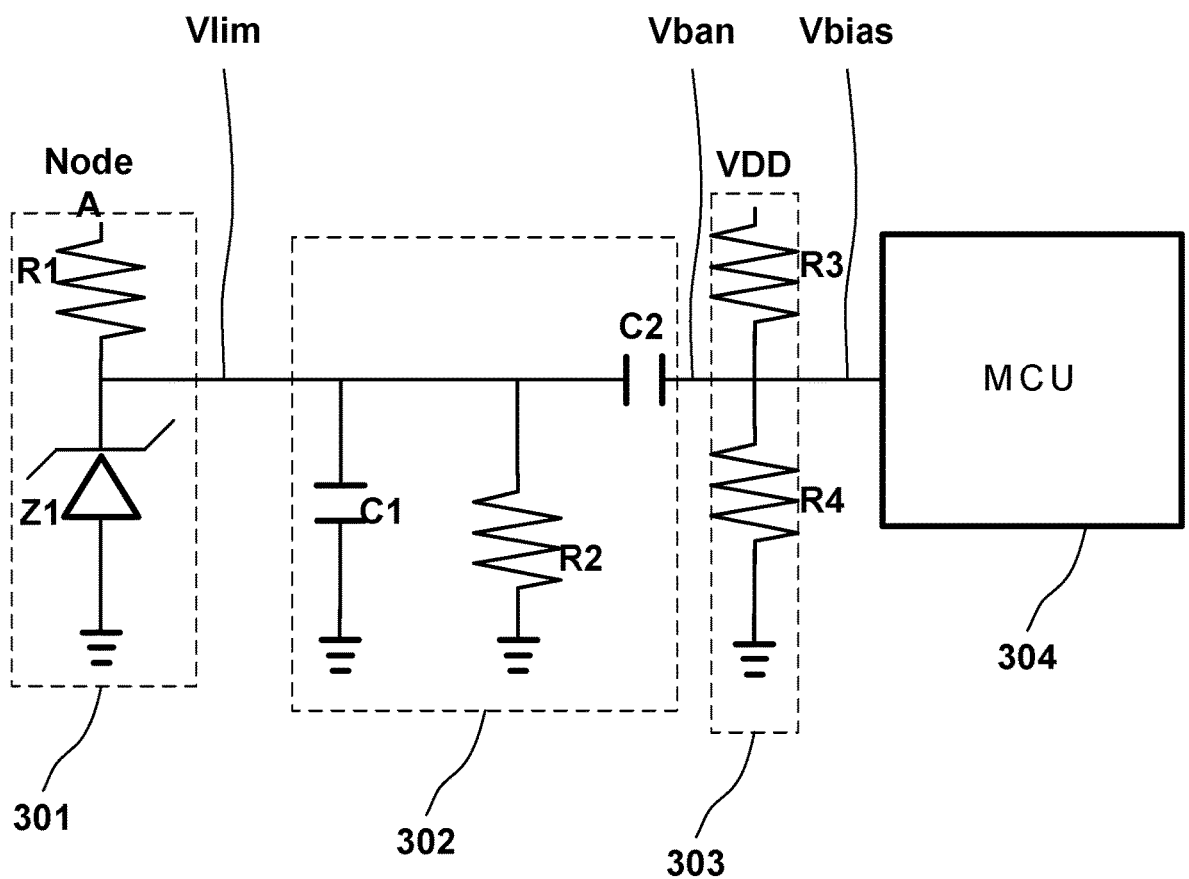
FIG. 3 is a circuit diagram showing a frequency decoding circuit 206 of a wireless charging receiver according to a preferred embodiment of the invention.

FIG. 3 is a circuit diagram showing the frequency decoding circuit 206 of the wireless charging receiver according to a preferred embodiment of the invention. Referring to FIG. 3, the frequency decoding circuit 206 includes a voltage limiting circuit 301, a band pass filter 302, a DC bias circuit 303 and a microprocessor 304. The voltage limiting circuit 301 is implemented by a resistor R1 and a Zener diode Z1. The band pass filter 302 is implemented by two capacitors C1 and C2 and a resistor R2. The DC bias circuit 303 is implemented by two resistors R3 and R4.

The voltage limiting circuit 301 receives a voltage of the resonant circuit 200 to limit an amplitude of the voltage sampled from the resonant circuit 200, and outputs a limited voltage Vlim. The band pass filter 302 receives the limited voltage Vlim, performs band pass filtering, and outputs a band-pass filtered signal Vban. The band-pass filtered signal Vban is the signal generated after the noise is filtered from the above-mentioned signal ranging from 110 KHZ to 205 KHZ. The DC bias circuit 303 performs DC biasing on the band-pass filtered signal Vban to obtain a DC bias signal Vbias. The microprocessor 304 receives the DC bias signal Vbias, and performs demodulation and XOR inspection according to the frequency of the DC bias signal Vbias. If the operation is correct, then the packet can be regarded as being successfully received. Thus, the message transmitted by the wireless transmitter can be decoded.

Figure 4:
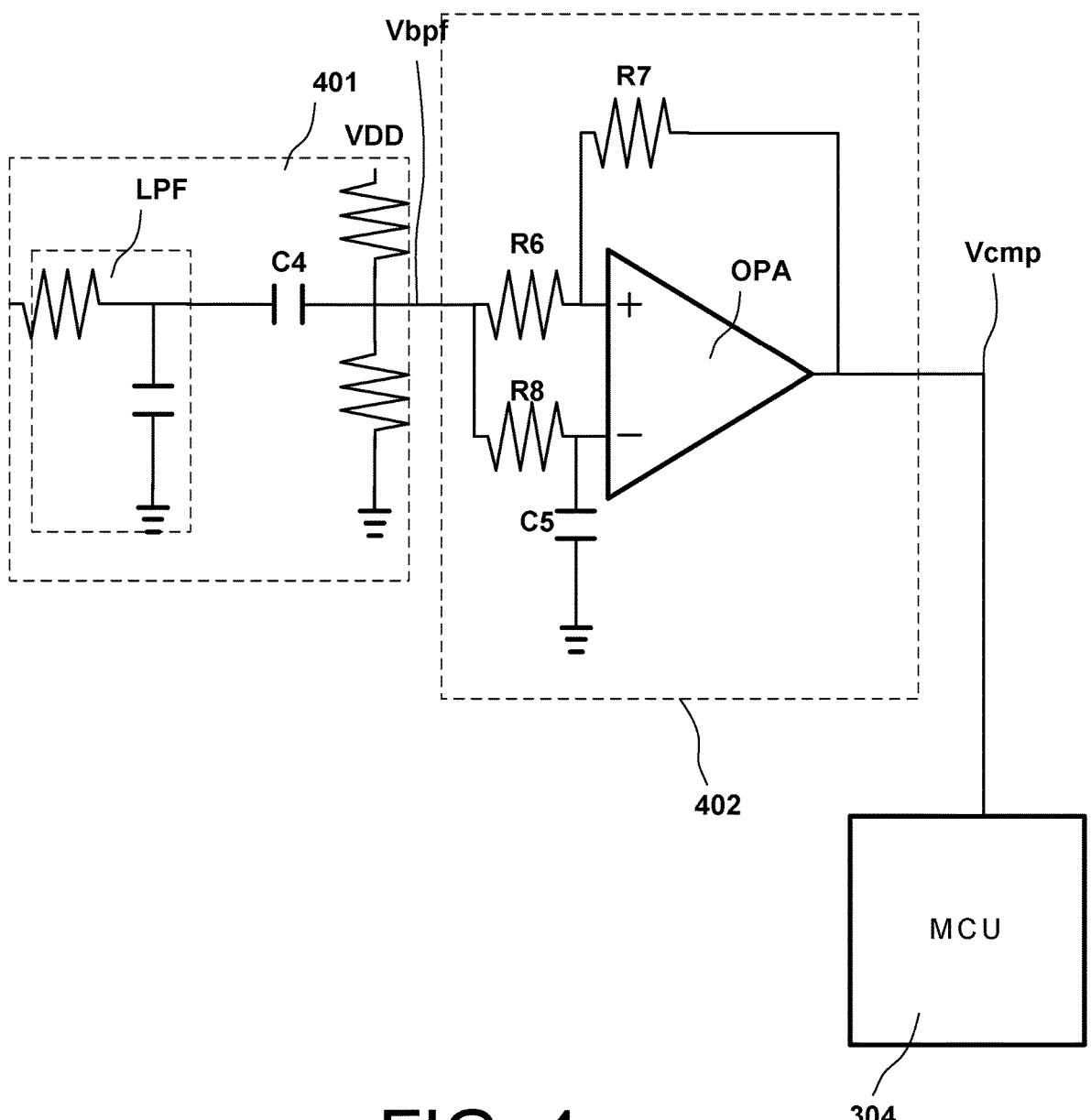
FIG. 4 is a circuit diagram showing a voltage amplitude decoding circuit 207 of a wireless charging receiver according to a preferred embodiment of the invention.

FIG. 4 is a circuit diagram showing the voltage amplitude decoding circuit 207 of the wireless charging receiver according to a preferred embodiment of the invention. Referring to FIG. 4, the voltage amplitude decoding circuit 207 includes a band pass filter 401, a Schmitt trigger 402 and the above-mentioned microprocessor 304. The band pass filter 401 is implemented by a low-pass filter LPF and an AC isolation capacitor C4. The Schmitt trigger 402 is implemented by an amplifier OPA, resistors R6, R7 and R8 and a capacitor C5.

The band pass filter 401 is coupled to the node A, receives the voltage of the resonant circuit 200, performs band pass filtering, and outputs a band-pass filtered signal Vbpf. The frequency of the band-pass filtered signal Vbpf ranges from about 1 KHZ to about 2 KHZ in this embodiment. The Schmitt trigger 402 receives the band-pass filtered signal Vbpf and outputs a comparison signal Vcmp. That is, the Schmitt trigger 402 converts the above-mentioned band-pass filtered signal Vbpf into a square-waveform comparison signal Vcmp. The microprocessor 304 receives the comparison signal Vcmp, and performs the XOR inspection according to the comparison signal Vcmp. If the operation is correct, then the packet can be regarded as being successfully received. Thus, the message transmitted by the wireless transmitter can be decoded.

In the above-mentioned embodiment, the microprocessor 304 receives the signal of the Schmitt trigger 402 and the DC bias signal Vbias at the same time, and performs synchronous decoding. As long as one of the signals is correct in the XOR inspection operation, the packet can be regarded as being successfully received. As can be seen from the above-mentioned circuit, when the wireless transmitter uses the phase shift pulse width modulation, the excessive noise is caused, and the noise of the DC bias signal Vbias sent into the microprocessor 304 is too much, thereby causing the incorrect frequency. The decoding can be successfully performed by the anti-noise ability of the Schmitt trigger 402 of the voltage amplitude decoding circuit 207. In addition, when the wireless transmitter outputs the lower power and the frequency ranges from 180 KHZ to 205 KHZ, the amplitude of the voltage is too small. When the Schmitt trigger 402 cannot operate, the frequency decoding circuit 206 can run normally, so that the microprocessor 304 can normally perform decoding to obtain the message transmitted by the wireless transmitter.

Figure 5:
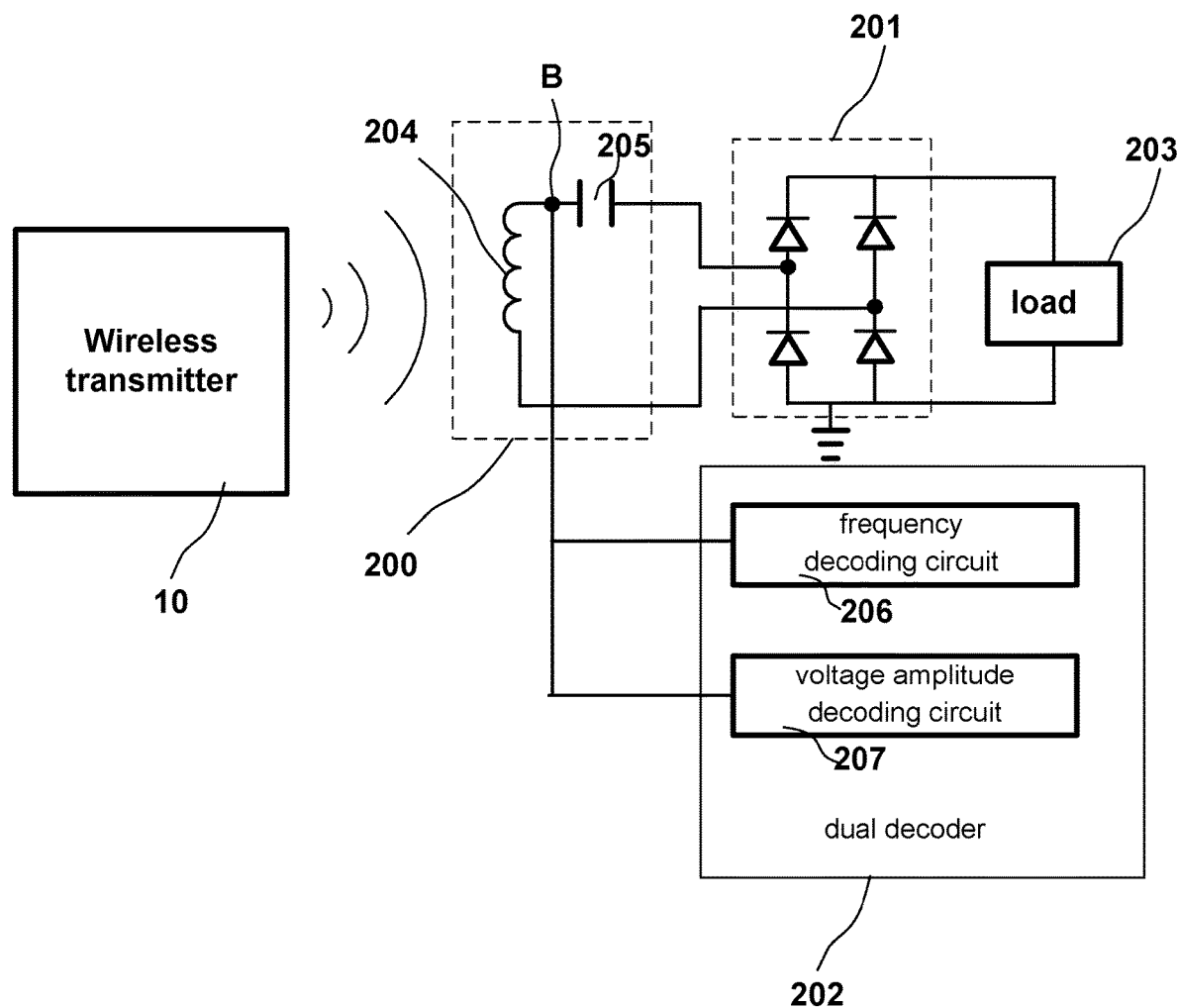
FIG. 5 is a circuit diagram showing a wireless charging receiver according to a preferred embodiment of the invention.

FIG. 5 is a circuit diagram showing a wireless charging receiver according to a preferred embodiment of the invention. Referring to FIG. 5, the wireless charging receiver includes a resonant circuit 200, a bridge rectifier circuit 201, a dual decoder for the wireless charging receiver 202 and a load 203. The resonant circuit 200 also includes an inductor 204 and a capacitor 205. The dual decoder for the wireless charging receiver 202 includes a frequency decoding circuit 206 and a voltage amplitude decoding circuit 207. Comparing FIG. 5 with FIG. 2, it can be seen that both the frequency decoding circuit 206 and the voltage amplitude decoding circuit 207 are coupled to a node B (i.e., the coupled portion between the inductor 204 and the capacitor 205).

Figure 6:
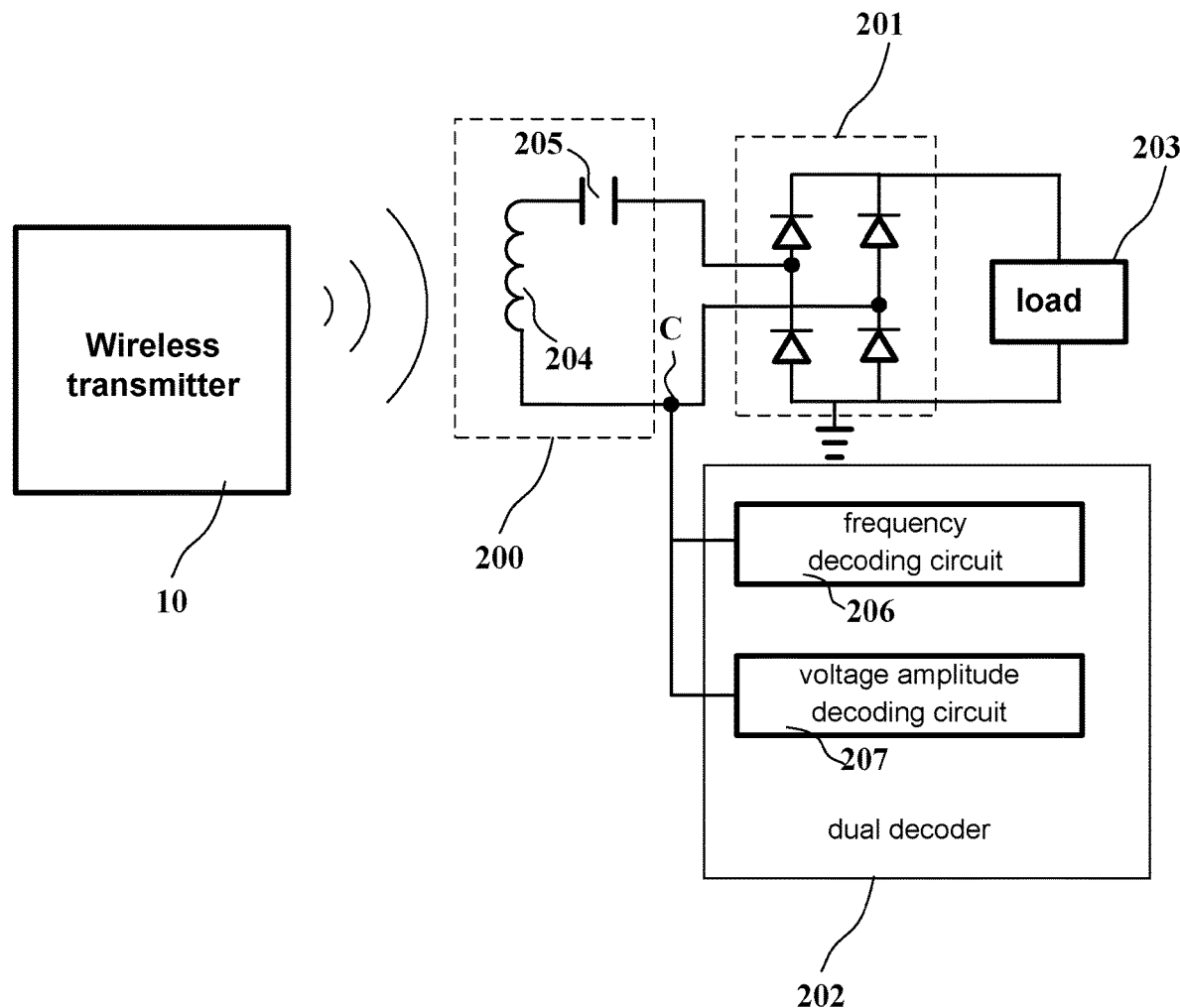
FIG. 6 is a circuit diagram showing a wireless charging receiver according to a preferred embodiment of the invention.

FIG. 6 is a circuit diagram showing a wireless charging receiver according to a preferred embodiment of the invention. Referring to FIG. 6, the wireless charging receiver includes a resonant circuit 200, a bridge rectifier circuit 201, a dual decoder for the wireless charging receiver 202 and a load 203. The resonant circuit 200 also includes an inductor 204 and a capacitor 205. The dual decoder for the wireless charging receiver 202 includes a frequency decoding circuit 206 and a voltage amplitude decoding circuit 207. Comparing FIG. 6 with FIG. 2, it can be seen that both the frequency decoding circuit 206 and the voltage amplitude decoding circuit 207 are coupled to a node C (inductor 204).

Figure 7:
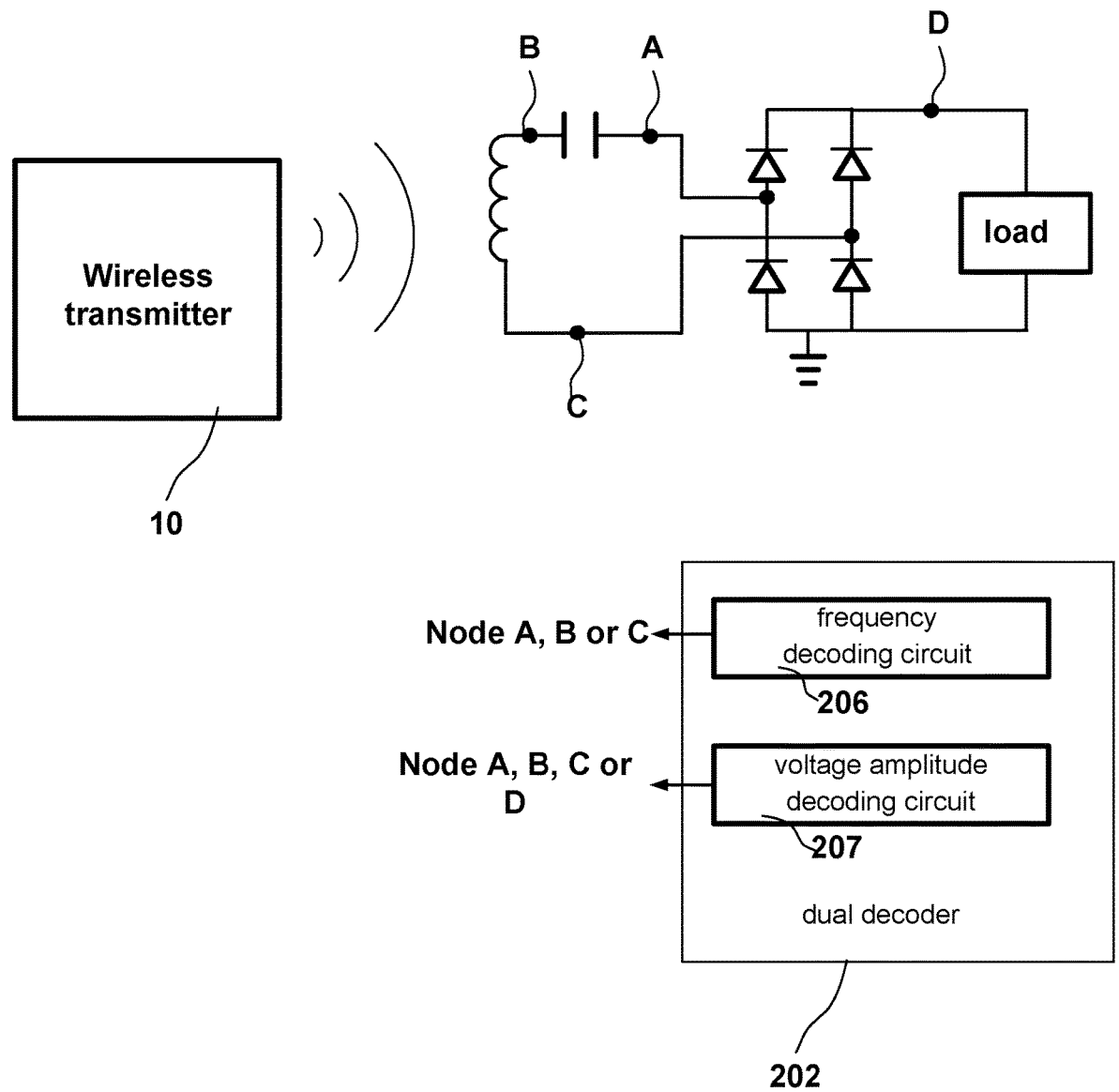
FIG. 7 is a circuit diagram showing a wireless charging receiver according to a preferred embodiment of the invention.

In the above-mentioned embodiment, although both the frequency decoding circuit 206 and the voltage amplitude decoding circuit 207 are coupled to the node A, B or C, the frequency decoding circuit 206 and the voltage amplitude decoding circuit 207 may be separately and selectively coupled to the node A, B or C. For example, the frequency decoding circuit 206 is coupled to the node A, but the voltage amplitude decoding circuit 207 is coupled to the node B. In another example, the frequency decoding circuit 206 is coupled to the node B, but the voltage amplitude decoding circuit 207 is coupled to the node C. So, the invention is not restricted thereto. In addition, FIG. 7 is a circuit diagram showing a wireless charging receiver according to a preferred embodiment of the invention. As shown in FIG. 7, a node D is depicted in addition to the nodes A, B and C. More especially, because the voltage amplitude decoding circuit 207 adopts voltage decoding, it is also coupled to the node D in addition to the coupling to the nodes A, B and C. However, the frequency decoding circuit 206 cannot receive the signal from the node D to operate. So, the frequency decoding circuit 206 cannot be coupled to the node D.

Similarly, in several embodiments mentioned hereinabove, positions of the inductor and the capacitor of the resonant circuits 100 and 200 may be interchanged or may be changed from serial connections to parallel connections, and the invention is not restricted thereto.

Figure 8:
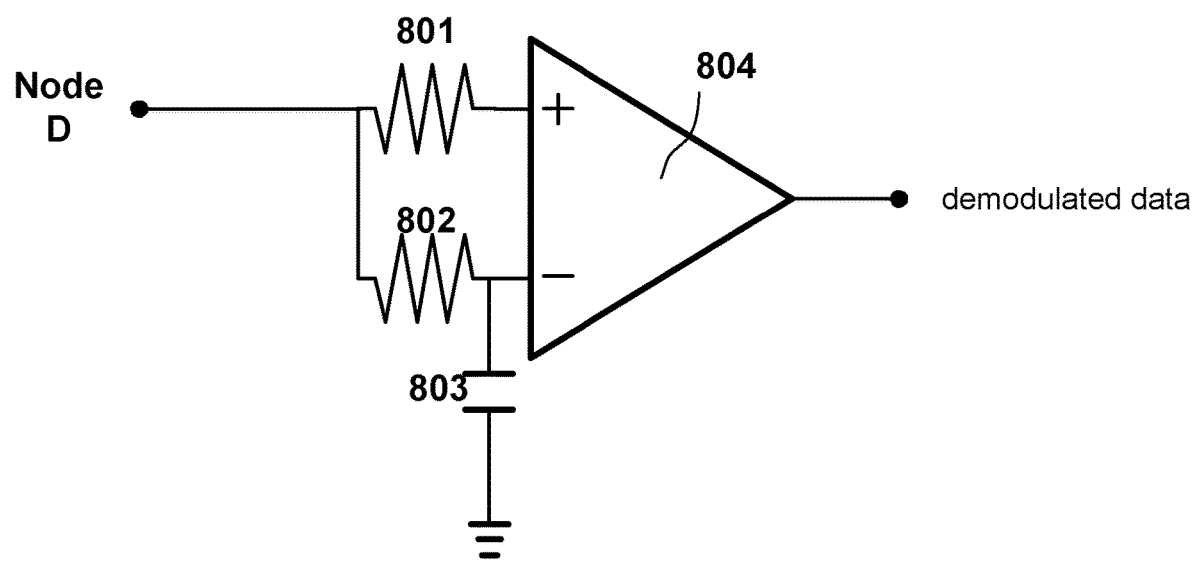
FIG. 8 is a circuit diagram showing a voltage amplitude decoding circuit 207 of a wireless charging receiver according to a preferred embodiment of the invention.

FIG. 8 is a circuit diagram showing the voltage amplitude decoding circuit 207 of the wireless charging receiver according to a preferred embodiment of the invention. Referring to FIG. 8, the voltage amplitude decoding circuit 207 includes a first resistor 801, a second resistor 802, a first capacitor 803 and an amplifier 804. First terminals of the first resistor 801 and the second resistor 802 are coupled to the node D, a second terminal of the first resistor 801 is coupled to a positive input terminal of the amplifier 804, a second terminal of the second resistor 802 is coupled to a negative input terminal of the amplifier 804, a first terminal of the first capacitor 803 is coupled to the negative input terminal of the amplifier 804, and a second terminal of the first capacitor 803 is coupled to a common voltage. Although the high-frequency component has been filtered out after the signal of the node D has been rectified, the signal ranging from 1 KHz to 2 KHz still has the minor variation on the power. With this comparator, the negative input terminal samples the DC voltage, the positive input terminal compares the minor variation with the DC voltage of the negative input terminal to obtain demodulated data, so that the message transmitted by the wireless transmitter can be extracted.

In summary, the essence of the invention utilizes two different mechanisms of decoding circuits to complement each other, wherein one of the mechanisms uses the frequency sampling and the other one of the mechanisms uses the AC voltage amplitude sampling. Thus, the problem of missing of the packets received by the wireless receiver is solved, so that the communication system of the wireless receiver becomes robuster.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A dual decoder for performing a decode in a wireless charging receiver, wherein the wireless charging receiver comprises a resonant circuit and a rectifier circuit, wherein the rectifier circuit converts wireless energy received by the resonant circuit into a direct current, wherein the dual decoder comprises:
   a frequency decoding circuit, which is coupled to the resonant circuit, and performs decoding according to a frequency of a voltage of the resonant circuit to obtain an instruction of a wireless transmitter; and
   a voltage amplitude decoding circuit, which is coupled to the resonant circuit, extracts a carrier on the voltage of the resonant circuit through a filter, and decodes the carrier into the instruction of the wireless transmitter,
   wherein the frequency decoding circuit performs decoding to obtain a message transmitted by the wireless transmitter when the voltage amplitude decoding circuit cannot perform decoding;
   wherein when the frequency decoding circuit cannot perform decoding, the voltage amplitude decoding circuit performs decoding to obtain the message transmitted by the wireless transmitter.

2. The dual decoder according to claim 1, wherein the resonant circuit comprises:
   an inductor comprising a first terminal and a second terminal, wherein the first terminal of the inductor is coupled to a second input terminal of the rectifier circuit; and
   a capacitor comprising a first terminal and a second terminal, wherein the first terminal of the capacitor is coupled to the second terminal of the inductor, and the second terminal of the capacitor is coupled to a first input terminal of the rectifier circuit.

3. The dual decoder according to claim 2, wherein the frequency decoding circuit comprises:
   a voltage limiting circuit, which is coupled to the second terminal of the capacitor, receives the voltage of the resonant circuit, limits an amplitude of the voltage of the resonant circuit, and outputs a limited voltage;
   a band pass filter, which receives the limited voltage, performs band pass filtering and outputs a band-pass filtered signal;
   a DC bias circuit performing voltage dividing on the band-pass filtered signal to obtain a DC bias signal; and
   a microprocessor, which receives the DC bias signal, and performs decoding according to a frequency of the DC bias signal to obtain the message transmitted by the wireless transmitter.

4. The dual decoder according to claim 2, wherein the frequency decoding circuit comprises:
   a voltage limiting circuit, which is coupled to the first terminal of the capacitor, receives the voltage of the resonant circuit, limits an amplitude of the voltage of the resonant circuit, and outputs a limited voltage;
   a band pass filter, which receives the limited voltage, performs band pass filtering and outputs a band-pass filtered signal;
   a DC bias circuit, which performs voltage dividing on the band-pass filtered signal to obtain a DC bias signal; and
   a microprocessor, which receives the DC bias signal, and performs decoding according to a frequency of the DC bias signal to obtain the message transmitted by the wireless transmitter.

5. The dual decoder according to claim 2, wherein the frequency decoding circuit comprises:
   a voltage limiting circuit, which is coupled to the first terminal of the inductor, receives the voltage of the resonant circuit, limits an amplitude of the voltage of the resonant circuit, and outputs a limited voltage;
   a band pass filter, which receives the limited voltage, performs band pass filtering and outputs a band-pass filtered signal;
   a DC bias circuit performs voltage dividing on the band-pass filtered signal to obtain a DC bias signal; and
   a microprocessor, which receives the DC bias signal and performs decoding according to a frequency of the DC bias signal to obtain the message transmitted by the wireless transmitter.

6. The dual decoder according to claim 2, wherein the voltage amplitude decoding circuit comprises:
   a band pass filter, which is coupled to the first terminal of the capacitor, performs band pass filtering and outputs a band-pass filtered signal;
   a Schmitt trigger, which receives the band-pass filtered signal and outputs a comparison signal; and
   a microprocessor, which receives the comparison signal, and obtains the message transmitted by the wireless transmitter according to the comparison signal.

7. The dual decoder according to claim 2, wherein the voltage amplitude decoding circuit comprises:
   a band pass filter, which is coupled to the second terminal of the capacitor, performs band pass filtering and outputs a band-pass filtered signal;
   a Schmitt trigger, which receives the band-pass filtered signal and outputs a comparison signal; and
   a microprocessor, which receives the comparison signal, and obtains the message transmitted by the wireless transmitter according to the comparison signal.

8. The dual decoder according to claim 2, wherein the voltage amplitude decoding circuit comprises:
   a band pass filter, which is coupled to the first terminal of the inductor, performs band pass filtering and outputs a band-pass filtered signal;
   a Schmitt trigger, which receives the band-pass filtered signal and outputs a comparison signal; and
   a microprocessor, which receives the comparison signal, and obtains the message transmitted by the wireless transmitter according to the comparison signal.

9. The dual decoder according to claim 2, wherein the rectifier circuit comprises an output terminal and a common terminal, the output terminal of the rectifier circuit is coupled to a load, the common terminal of the rectifier circuit is coupled to a common voltage, and the voltage amplitude decoding circuit comprises:
- a band pass filter, which is coupled to the output terminal of the rectifier circuit, performs band pass filtering and outputs a band-pass filtered signal;
- a Schmitt trigger, which receives the band-pass filtered signal and outputs a comparison signal; and
- a microprocessor, which receives the comparison signal, and obtains the message transmitted by the wireless transmitter according to the comparison signal.

10. The dual decoder according to claim 2, wherein the rectifier circuit comprises an output terminal and a common terminal, the output terminal of the rectifier circuit is coupled to a load, the common terminal of the rectifier circuit is coupled to a common voltage, and the voltage amplitude decoding circuit comprises:
- a first resistor comprising a first terminal and a second terminal, wherein the first terminal of the first resistor is coupled to the output terminal of the rectifier circuit;
- a second resistor comprising a first terminal and a second terminal, wherein the first terminal of the second resistor is coupled to the output terminal of the rectifier circuit;
- an amplifier comprising a first input terminal, a second input terminal and an output terminal, wherein the first input terminal of the amplifier is coupled to the second terminal of the first resistor, and the second input terminal of the amplifier is coupled to the second terminal of the second resistor; and
- a capacitor comprising a first terminal and a second terminal, wherein the first terminal of the capacitor is coupled to the second input terminal of the amplifier, and the second terminal of the capacitor is coupled to the common voltage,
- wherein the output terminal of the amplifier outputs a decoded signal.

11. A wireless charging receiver, comprising:
- a resonant circuit;
- a rectifier circuit, which is coupled to the resonant circuit and converts wireless energy received by the resonant circuit into a direct current; and
- a dual decoder for the wireless charging receiver, comprising:
  - a frequency decoding circuit, which is coupled to the resonant circuit, and performs decoding according to a frequency of a voltage of the resonant circuit to obtain an instruction of a wireless transmitter; and
  - a voltage amplitude decoding circuit, which is coupled to the resonant circuit, extracts a carrier on the voltage of the resonant circuit through a filter, and decodes the carrier into the instruction of the wireless transmitter,
- wherein the frequency decoding circuit performs decoding to obtain a message transmitted by the wireless transmitter when the voltage amplitude decoding circuit cannot perform decoding;
- wherein when the frequency decoding circuit cannot perform decoding, the voltage amplitude decoding circuit performs decoding to obtain the message transmitted by the wireless transmitter.

12. The wireless charging receiver according to claim 11, wherein the resonant circuit comprises:
- an inductor comprising a first terminal and a second terminal, wherein the first terminal of the inductor is coupled to a second input terminal of the rectifier circuit; and
- a capacitor comprising a first terminal and a second terminal, wherein the first terminal of the capacitor is coupled to the second terminal of the inductor, and the second terminal of the capacitor is coupled to a first input terminal of the rectifier circuit.

13. The wireless charging receiver according to claim 12, wherein the frequency decoding circuit comprises:
- a voltage limiting circuit, which is coupled to the second terminal of the capacitor, receives the voltage of the resonant circuit, limits an amplitude of the voltage of the resonant circuit, and outputs a limited voltage;
- a band pass filter, which receives the limited voltage, performs band pass filtering and outputs a band-pass filtered signal;
- a DC bias circuit performing voltage dividing on the band-pass filtered signal to obtain a DC bias signal; and
- a microprocessor, which receives the DC bias signal, and performs decoding according to a frequency of the DC bias signal to obtain the message transmitted by the wireless transmitter.

14. The wireless charging receiver according to claim 12, wherein the frequency decoding circuit comprises:
- a voltage limiting circuit, which is coupled to the first terminal of the capacitor, receives the voltage of the resonant circuit, limits an amplitude of the voltage of the resonant circuit, and outputs a limited voltage;
- a band pass filter, which receives the limited voltage, performs band pass filtering and outputs a band-pass filtered signal;
- a DC bias circuit, which performs voltage dividing on the band-pass filtered signal to obtain a DC bias signal; and
- a microprocessor, which receives the DC bias signal, and performs decoding according to a frequency of the DC bias signal to obtain the message transmitted by the wireless transmitter.

15. The wireless charging receiver according to claim 12, wherein the frequency decoding circuit comprises:
- a voltage limiting circuit, which is coupled to the first terminal of the inductor, receives the voltage of the resonant circuit, limits an amplitude of the voltage of the resonant circuit, and outputs a limited voltage;
- a band pass filter, which receives the limited voltage, performs band pass filtering and outputs a band-pass filtered signal;
- a DC bias circuit performs voltage dividing on the band-pass filtered signal to obtain a DC bias signal; and
- a microprocessor, which receives the DC bias signal and performs decoding according to a frequency of the DC bias signal to obtain the message transmitted by the wireless transmitter.

16. The wireless charging receiver according to claim 12, wherein the voltage amplitude decoding circuit comprises:
- a band pass filter, which is coupled to the first terminal of the capacitor, performs band pass filtering and outputs a band-pass filtered signal;
- a Schmitt trigger, which receives the band-pass filtered signal and outputs a comparison signal; and
- a microprocessor, which receives the comparison signal, and obtains the message transmitted by the wireless transmitter according to the comparison signal.

17. The wireless charging receiver according to claim 12, wherein the voltage amplitude decoding circuit comprises:
- a band pass filter, which is coupled to the second terminal of the capacitor, performs band pass filtering and outputs a band-pass filtered signal;
- a Schmitt trigger, which receives the band-pass filtered signal and outputs a comparison signal; and a microprocessor, which receives the comparison signal, and obtains the message transmitted by the wireless transmitter according to the comparison signal.

18. The wireless charging receiver according to claim 12, wherein the voltage amplitude decoding circuit comprises:
   a band pass filter, which is coupled to the first terminal of the inductor, performs band pass filtering and outputs a band-pass filtered signal;
   a Schmitt trigger, which receives the band-pass filtered signal and outputs a comparison signal; and
   a microprocessor, which receives the comparison signal, and obtains the message transmitted by the wireless transmitter according to the comparison signal.

19. The wireless charging receiver according to claim 12, wherein the rectifier circuit comprises an output terminal and a common terminal, the output terminal of the rectifier circuit is coupled to a load, the common terminal of the rectifier circuit is coupled to a common voltage, and the voltage amplitude decoding circuit comprises:
   a band pass filter, which is coupled to the output terminal of the rectifier circuit, performs band pass filtering and outputs a band-pass filtered signal;
   a Schmitt trigger, which receives the band-pass filtered signal and outputs a comparison signal; and
   a microprocessor, which receives the comparison signal, and obtains the message transmitted by the wireless transmitter according to the comparison signal.

20. The wireless charging receiver according to claim 12, wherein the rectifier circuit comprises an output terminal and a common terminal, the output terminal of the rectifier circuit is coupled to a load, the common terminal of the rectifier circuit is coupled to a common voltage, and the voltage amplitude decoding circuit comprises:
   a first resistor comprising a first terminal and a second terminal, wherein the first terminal of the first resistor is coupled to the output terminal of the rectifier circuit;
   a second resistor comprising a first terminal and a second terminal, wherein the first terminal of the second resistor is coupled to the output terminal of the rectifier circuit;
   an amplifier comprising a first input terminal, a second input terminal and an output terminal, wherein the first input terminal of the amplifier is coupled to the second terminal of the first resistor, and the second input terminal of the amplifier is coupled to the second terminal of the second resistor; and
   a capacitor comprising a first terminal and a second terminal, wherein the first terminal of the capacitor is coupled to the second input terminal of the amplifier, and the second terminal of the capacitor is coupled to the common voltage,
   wherein the output terminal of the amplifier outputs a decoded signal.

* * * * *